United States Patent
Shimizu et al.

(10) Patent No.: US 8,419,831 B2
(45) Date of Patent: Apr. 16, 2013

(54) METHOD FOR EFFICIENTLY RECOVERING CARBON DIOXIDE IN GAS

(75) Inventors: Shinkichi Shimizu, Kizugawa (JP); Firoz Alam Chowdhury, Kizugawa (JP); Hiromichi Okabe, Kizugawa (JP); Kazuya Goto, Kizugawa (JP)

(73) Assignee: Research Institute of Innovative Technology for the Earth, Kizugawa-Shi (JP)

( * ) Notice: Subject to any disclaimer, the term of this patent is extended or adjusted under 35 U.S.C. 154(b) by 288 days.

(21) Appl. No.: 12/452,223

(22) PCT Filed: Jun. 24, 2008

(86) PCT No.: PCT/JP2008/061427
§ 371 (c)(1),
(2), (4) Date: Dec. 22, 2009

(87) PCT Pub. No.: WO2009/001804
PCT Pub. Date: Dec. 31, 2008

(65) Prior Publication Data
US 2010/0126348 A1 May 27, 2010

(30) Foreign Application Priority Data

Jun. 28, 2007 (JP) ................. 2007-170711

(51) Int. Cl.
*B01D 53/14* (2006.01)
(52) U.S. Cl.
USPC ............... 95/183; 95/236; 423/228; 423/229
(58) Field of Classification Search ............ None
See application file for complete search history.

(56) References Cited

U.S. PATENT DOCUMENTS

| 4,112,052 | A | | 9/1978 | Sartori et al. | |
|---|---|---|---|---|---|
| 5,618,506 | A | * | 4/1997 | Suzuki et al. | 423/228 |
| 6,500,397 | B1 | | 12/2002 | Yoshida et al. | |
| 2008/0078292 | A1 | * | 4/2008 | Mimura et al. | 95/187 |
| 2009/0199713 | A1 | * | 8/2009 | Asprion et al. | 95/236 |
| 2009/0277330 | A1 | * | 11/2009 | Yoshiyama et al. | 95/186 |

FOREIGN PATENT DOCUMENTS

| AU | 2006233153 | * | 10/2006 |
|---|---|---|---|
| CN | 1962032 A | | 5/2007 |
| JP | 2871334 | | 11/1993 |
| JP | 2871335 | | 11/1993 |
| JP | 08-103630 A | | 4/1996 |
| JP | 08-257354 A | | 10/1996 |
| JP | 08-257355 A | | 10/1996 |
| JP | 3197183 | | 10/1996 |
| JP | 2006-240966 A | | 9/2006 |

OTHER PUBLICATIONS

International Search Report dated Aug. 5, 2008, issued on PCT/JP2008/061427.

* cited by examiner

*Primary Examiner* — Duane Smith
*Assistant Examiner* — Pankti Patel
(74) *Attorney, Agent, or Firm* — Edwards Wildman Palmer LLP; James E. Armstrong, IV; Nicholas J. DiCeglie, Jr.

(57) ABSTRACT

Disclosed is a method for recovering carbon dioxide from a gas containing carbon dioxide, comprising the step (1) of bringing a gas containing carbon dioxide into contact with an aqueous solution containing 2-isopropylaminoethanol and at least one substance selected from the group consisting of piperazines and alkanolamines to absorb carbon dioxide into the aqueous solution; and the step (2) of heating the aqueous solution containing carbon dioxide absorbed therein, which is obtained in the step (1), to separate and recover carbon dioxide from the solution.

6 Claims, No Drawings

METHOD FOR EFFICIENTLY RECOVERING CARBON DIOXIDE IN GAS

TECHNICAL FIELD

The present invention relates to a method for recovering carbon dioxide ($CO_2$) from a gas containing carbon dioxide, which comprises absorbing carbon dioxide using an aqueous solution for $CO_2$ recovery, and subsequently separating and recovering carbon dioxide from the aqueous solution.

BACKGROUND ART

In recent years, frequent disasters and climate change that are probably caused by global warming have had a tremendous influence on agricultural production, living conditions, energy consumption, etc. This global warming is considered to be caused by an increase in the presence of greenhouse gases such as carbon dioxide, methane, nitrous oxide, and CFCs in the atmosphere, which is associated with an increase in human activity. The main gas among the greenhouse gases is atmospheric carbon dioxide. To prevent global warming, the Global Warming Prevention Conference (COP3) was held in Kyoto in December, 1997. The Kyoto Protocol, which was adopted at the Global Warming Prevention Conference, went into effect on Feb. 16, 2005. There is thus an urgent need for a measure to reduce carbon dioxide emissions.

Examples of sources of carbon dioxide include thermal power plants, boilers of factories or kilns of cement plants using coal, heavy oil, natural gas, or the like as a fuel; blast furnaces of iron mills where iron oxide is reduced using coke; and transportation equipment using gasoline, heavy oil, light oil or the like as a fuel, such as automobiles, ships, and aircrafts. Except for transportation equipment, these sources of carbon dioxide are fixed facilities, which are expected to be easily adapted to implement $CO_2$ emission reduction measures.

Several methods for recovering carbon dioxide from gas are already known, and a wide variety of methods are currently in development.

For example, one method that has been in development since the 1930s comprises bringing a gas containing carbon dioxide into contact with an aqueous alkanolamine solution in an absorption tower to absorb carbon dioxide into the solution, and then heating the aqueous solution for $CO_2$ recovery to separate and recover carbon dioxide using a regenerator. This method is now used in urea synthesis plant towers. This method is economical, and can be carried out on a large scale.

Examples of alkanolamines include monoethanolamine (hereinafter sometimes referred to as MEA), diethanolamine (hereinafter sometimes referred to as DEA), triethanolamine (hereinafter sometimes referred to as TEA), N-methyldiethanolamine (hereinafter sometimes referred to as MDEA), diisopropanolamine (DIPA), diethylene glycol amine (DGA), and the like. MEA is typically used.

However, the use of such an aqueous alkanolamine solution as an absorbing solution requires either the use of an expensive anti-corrosion steel as the equipment material or the reduction of the amine concentration in the absorbing solution, because the solution is highly corrosive to the equipment material. Furthermore, because it is difficult to separate the absorbed carbon dioxide, the solution must be heated at a high separation temperature of 120° C. to separate and recover carbon dioxide. Another disadvantage is the high energy, i.e., 20 kcal/mol $CO_2$, required to separate carbon dioxide from the absorbing solution. For example, to recover carbon dioxide in an electric power plant by this method, extra energy that corresponds to 20% of the generated electric power is required. In an age when the reduction of carbon dioxide emissions, energy saving, and resource saving are desired, this high energy consumption is a major impediment to the realization of a carbon dioxide absorption and recovery system.

For example, Patent Document 1 describes a method of removing carbon dioxide from combustion exhaust gas, comprising bringing combustion exhaust gas at atmospheric pressure into contact with an aqueous solution of a so-called "hindered amine" to absorb carbon dioxide into the aqueous solution. The "hindered amine" has a steric hindrance around the amino group, such as in an alkyl group.

Patent Document 1 describes using 2-methylaminoethanol (hereinafter sometimes referred to as MAE) or 2-ethylaminoethanol (hereinafter sometimes referred to as EAE) as a hindered amine in the Examples, and further states that an aqueous solution of MAE or EAE is preferably used to absorb carbon dioxide. Although not described in the Examples, other amines such as 2-isopropylaminoethanol (hereinafter sometimes referred to as "IPAE") are also mentioned as examples of hindered amines in Patent Document 1.

Patent Document 2 describes a method of recovering carbon dioxide, comprising the step of bringing a mixed gas into contact with an aqueous amine solution to absorb carbon dioxide into the aqueous solution, and the step of separating carbon dioxide from the aqueous solution.

Patent Document 2 describes, as aqueous amine solutions, compounds containing a secondary amino group attached to a secondary or tertiary carbon, or compounds containing a primary amine attached to a tertiary carbon, such as 2-methylpiperazine (hereinafter sometimes referred to as 2MPZ) and 2-amino-2-methyl-1-propanol (hereinafter sometimes referred to as AMP).

Patent Document 3 describes a method for removing carbon dioxide from combustion exhaust gas, which comprises the step of bringing the combustion exhaust gas into contact with a mixed aqueous solution containing 100 parts by weight of a first amine compound selected from the following compounds (A) and (C) shown below, and 1 to 25 parts by weight of a second amine compound selected from compounds (D) to (I) shown below: (A) a compound containing one alcoholic hydroxyl group and a primary amino group in the molecule, the primary amino group being bonded to a tertiary carbon atom having two unsubstituted alkyl groups; (C) diethanolamine; (D) piperazine, (E) piperidine; (F) morpholine; (G) glycine; (H) 2-piperidinoethanol; and (I) a compound that has one alcoholic hydroxyl group and a secondary amino group in the molecule, the second amino group having an unsubstituted alkyl group having 3 or less carbon atoms, and a nitrogen atom bonded to a carbon-chain group containing two or more carbon atoms inclusive of the bonded carbon atom. Patent Document 3 describes ethylaminoethanol and 2-methylaminoethanol as preferable examples of amino compounds denoted by (I).

Patent Document 4 describes a method of removing carbon dioxide from combustion exhaust gas, comprising bringing combustion exhaust gas at atmospheric pressure into contact with an aqueous amine mixed solution containing a secondary amine and a tertiary amine each having a concentration of 10 to 45 wt. %. In the Reference Examples of Patent Document 4, 30 wt. % aqueous solutions of 2-isopropylaminoethanol or others are described as experimental examples.

The method of recovering carbon dioxide comprises removal of carbon dioxide from combustion exhaust gas, i.e., a step of absorbing carbon dioxide into an aqueous solution, and a step of separating carbon dioxide from the aqueous solution. Accordingly, to efficiently recover carbon dioxide, the separation step as well as the absorption step must be performed with high efficiency.

Although many attempts have been made to increase the efficiency of the step for absorbing carbon dioxide into an aqueous solution as described above, either carbon dioxide separation efficiency was not considered, or the only available methods were insufficient in terms of the amount of $CO_2$ separated or the separation rate. Therefore, the balance between $CO_2$ absorption and $CO_2$ separation was poor in known methods for recovering carbon dioxide, which resulted in low carbon dioxide recovery efficiency.

Another important issue is reduction of the heat of the carbon dioxide absorption reaction, i.e., the heat used to separate carbon dioxide, in order to attain $CO_2$ recovery at low cost.

Patent Document 1: Japanese Patent No. 2,871,334
Patent Document 2: U.S. Pat. No. 4,112,052
Patent Document 3: Japanese Patent No. 2,871,335
Patent Document 4: Japanese Patent No. 3,197,183

DISCLOSURE OF THE INVENTION

Problem to be Solved by the Invention

In view of the above problem of the prior art, an object of the present invention is to provide a method for recovering high-purity carbon dioxide, which realizes highly efficient absorption of carbon dioxide from a gas, as well as highly efficient low-temperature separation of carbon dioxide from an aqueous solution in which carbon dioxide is absorbed. More specifically, an object of the present invention is to provide a method for recovering high-purity carbon dioxide, which achieves excellent performance in the amount of $CO_2$ absorbed and the $CO_2$ absorption rate (these two properties are hereinafter together referred to as "absorption performance"), as well as in the amount of $CO_2$ separated and the $CO_2$ separation rate (these two properties are hereinafter together referred to as "separation performance"); the method comprising efficiently absorbing and separating carbon dioxide by using an aqueous solution for $CO_2$ recovery that enables separation of carbon dioxide at low temperatures.

Means for Solving the Problem

To achieve the above objects, the present inventors carried out extensive research. As a result, the inventors found that a mixture of 2-isopropylaminoethanol with piperazines or alkanolamines exhibits high absorption performance and particularly high separation performance. The present inventors continued their research based on this finding, and finally accomplished the present invention.

More specifically, the present invention provides novel methods for efficiently recovering carbon dioxide, comprising the following constituent features.

Item 1. A method for recovering carbon dioxide from a gas containing carbon dioxide, comprising the step (1) of bringing a gas containing carbon dioxide into contact with an aqueous solution containing 2-isopropylaminoethanol represented by formula (I):

[Chem. 1]

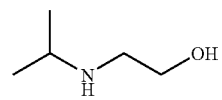

(I)

and at least one substance selected from the group consisting of piperazines represented by formula (II) and alkanolamines represented by formula (III) to absorb carbon dioxide into the aqueous solution; and the step (2) of heating the aqueous solution containing carbon dioxide absorbed therein, which is obtained in step (1), to separate and recover carbon dioxide from the solution.

[Chem. 2]

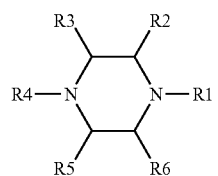

(II)

(wherein R1, R2, R3, R4, R5, and R6 are the same or different, and represent hydrogen, a $C_{1-2}$ alkyl group, an amino-substituted $C_{1-2}$ alkyl group, or a hydroxyl-substituted $C_{1-2}$ alkyl group).

[Chem. 3]

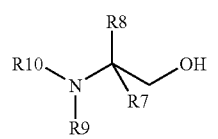

(III)

(wherein R7, R8, R9, and R10 are the same or different, and represent hydrogen, a $C_{1-2}$ alkyl group, an amino-substituted $C_{1-2}$ alkyl group, or a hydroxyl-substituted $C_{1-2}$ alkyl group).

Item 2. The method for recovering carbon dioxide according to Item 1, wherein in step (1), the gas containing carbon dioxide is brought into contact with the aqueous solution at a temperature of not more than 60° C., and in step (2), the aqueous solution containing carbon dioxide absorbed therein is heated to 70° C. or higher to separate carbon dioxide from the solution.

Item 3. The method for recovering carbon dioxide according to Item 1 or 2, wherein the piperazines represented by formula (II) are at least one compound selected from the group consisting of piperazine, 2-methylpiperazine, and 2-aminomethylpiperazine.

Item 4. The method for recovering carbon dioxide according to any one of Items 1 to 3, wherein the alkanolamines represented by formula (III) are at least one substance selected from the group consisting of 2-amino-2-methyl-1-propanol, 2-ethylaminoethanol, and N-methyldiethanolamine.

Item 5. The method for recovering carbon dioxide according to Item 1 or 2, wherein the aqueous solution contains 2-isopropylaminoethanol and piperazine.

Item 6. The method for recovering carbon dioxide according to any one of Items 1 to 5, wherein the total amine content of the aqueous solution is 30 to 60 wt. %, and the 2-isopropylaminoethanol content is 10 to 59 wt. %.

Effect of the Invention

The method for separating and recovering carbon dioxide using the aqueous solution for $CO_2$ recovery of the present invention has, in addition to excellent carbon dioxide absorption performance, excellent carbon dioxide separation performance compared to methods using a known aqueous solution for $CO_2$ recovery, and has a good balance between carbon dioxide absorption performance and carbon dioxide separation performance. Accordingly, an extremely large amount of carbon dioxide can be recovered per cycle of the absorption and separation steps.

Furthermore, the heat of the absorption reaction of carbon dioxide is low. Therefore, carbon dioxide can be separated at low temperatures to recover high-purity carbon dioxide. Separation of carbon dioxide at low temperatures results in reduction of the energy required to raise the water temperature of the amine aqueous solution, thus providing a great energy-saving effect in the separation step.

As described above, the present invention realizes downsizing of carbon dioxide absorption towers, carbon dioxide separation towers, and equipment associated with such towers; and also reduces the amount of liquid circulated to thereby reduce construction cost as well as energy loss, which leads to energy saving in the separation step. Therefore, the present invention is of great industrial value.

BEST MODE FOR CARRYING OUT THE INVENTION

The method for recovering carbon dioxide from a gas containing carbon dioxide comprises the step (1) of bringing the gas containing carbon dioxide into contact with an aqueous solution containing 2-isopropylaminoethanol represented by formula (I)

[Chem. 4]

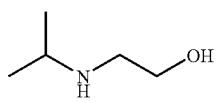
(I)

and at least one substance selected from the group consisting of piperazines represented by formula (II) and alkanolamines represented by formula (III) to absorb carbon dioxide into the solution; and the step (2) of heating the aqueous solution containing carbon dioxide absorbed therein to separate and recover carbon dioxide from the solution.

[Chem. 5]

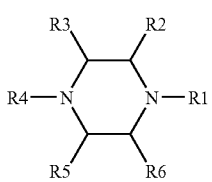
(II)

(wherein R1, R2, R3, R4, R5 and R6 are the same or different, and represent hydrogen, a $C_{1-2}$ alkyl group, an amino-substituted $C_{1-2}$ alkyl group, or a hydroxyl-substituted $C_{1-2}$ alkyl group).

[Chem. 6]

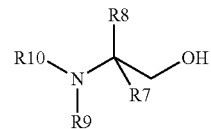
(III)

(wherein R7, R8, R9, and R10 are the same or different, and represent hydrogen, a $C_{1-2}$ alkyl group, an amino-substituted $C_{1-2}$ alkyl group, or a hydroxyl-substituted $C_{1-2}$ alkyl group).

Aqueous Solution for Carbon Dioxide Recovery

A feature of the present invention is to use a specific aqueous solution for $CO_2$ recovery. The aqueous solution contains 2-isopropylaminoethanol, and at least one substance selected from the group consisting of piperazines represented by formula (II) and alkanolamines represented by formula (III) (hereinafter simply referred to as "an amine (A)").

The amount of amine in the aqueous amine solution, which is an aqueous solution for $CO_2$ recovery of the present invention, is expressed in weight percentage relative to the weight of the aqueous amine solution from which the weight of carbon dioxide absorbed in the solution is excluded.

The amount of IPAE and amine (A) in the aqueous solution, which is defined as "the total amine content" in this specification, is 30 to 60 wt. %, preferably 30 to 55 wt. %, and more preferably 40 to 55 wt. %.

The amount of IPAE that is an essential component of the aqueous solution is 10 to 59 wt. %, preferably 10 to 57 wt. %, and more preferably 10 to 52 wt. %.

IPAE, which is an essential component of the aqueous solution of the present invention, is a secondary amine compound. Many secondary amine compounds are known to be used for $CO_2$-absorbing solutions.

The present invention using IPAE as an essential component was accomplished, based on the following findings by the present inventors.

Carbon dioxide absorbed in an aqueous organic amine solution is known to form either carbamate anion or bicarbonate ion in the aqueous solution. The heat of the reaction of carbamate anion is known to be higher than that of bicarbonate ion. These differences are considered to be attributable to the structural difference of the amine molecule. Because the difference in the bonding state of carbon dioxide and amine causes differences in the carbon dioxide separation rate and in the amount of $CO_2$ separated in the separation step after the absorption, elucidation of the bonding state is an important issue. According to $^{13}C$-NMR measurement by the present inventors, 2-aminoethanol (MEA), which is a typical primary alkanolamine, mainly forms carbamate anion with a high heat of absorption reaction, and hardly forms bicarbonate ion with a low heat of absorption reaction. As with MEA, 2-ethylaminoethanol (EAE), which is a secondary alkanolamine, mainly forms carbamate anion with a high heat of absorption reaction, and hardly forms bicarbonate ion with a low heat of absorption reaction.

In contrast, 2-isopropylaminoethanol (IPAE), which is an essential component of the present invention, is different from many other amines in that although IPAE belongs to secondary amine compounds, IPAE scarcely forms carbamate anion with a high heat of absorption reaction, and mainly forms bicarbonate ion with a low heat of absorption reaction heat. This is presumably because the isopropyl group that is present as a substituent for the amino group in the IPAE molecule has a bulky, three-dimensional feature, unlike the ethyl group of EAE, and thereby remarkably inhibits carbamate bond formation.

To confirm this presumption, the present inventors examined the absorption performance and separation performance of a 30 wt. % aqueous solution of 2-isopropylaminoethanol (IPAE) described as Reference Example in Patent Document 4. Compared to known amines, although the aqueous solution of 2-isopropylaminoethanol did not exhibit particularly excellent carbon dioxide absorption performance in terms of the amount of $CO_2$ absorbed and the $CO_2$ absorption rate, the solution exhibited enhanced $CO_2$ separation performance in terms of the amount of $CO_2$ separated and the $CO_2$ separation rate compared to known amines, and also had a good balance between $CO_2$ absorption performance and $CO_2$ separation performance.

The present inventors believed that this excellent performance was probably due to the mechanism of carbon dioxide absorption by the produced bicarbonate ion, and hypothesized that mixing of IPAE with other amine that forms carbamate anion having a high carbon dioxide absorption capability would change the absorption performance and separation performance of the aqueous amine solution. The present inventors investigated various amine mixed aqueous solutions. As a result, the inventors found an aqueous amine solution that exhibits particularly excellent $CO_2$ separation performance as well as excellent $CO_2$ absorption performance, and accomplished the present invention.

Next, the "other amine" to be mixed with IPAE is described.

Examples of substituents in the compounds of formulas (II) and (III) used as other amine in the present invention are described below.

Examples of the $C_{1-2}$ alkyl group include methyl and ethyl.

Examples of the amino-substituted $C_{1-2}$ alkyl group include alkyl groups substituted with 1 or 2 (preferably 1) amino groups, and having 1 or 2 carbon atoms. Specific examples thereof include an aminomethyl group, a 2-aminoethyl group, and the like.

Examples of the hydroxyl-substituted $C_{1-2}$ alkyl group include alkyl groups substituted with 1 or 2 (preferably 1) hydroxyl groups, and having 1 or 2 carbon atoms. Specific examples thereof include a hydroxymethyl group, a 2-hydroxyethyl group, and the like.

Specific examples of piperazines represented by formula (II) include piperazine (PZ), 2-methylpiperazine (2 MPZ), 2-(2-hydroxyethyl)piperazine (2HEPZ), 2-aminomethylpiperazine (2AMPZ), and the like.

It is said that such a piperazine derivative functions as a reaction activator in the absorption of carbon dioxide, and increases the reaction rate and the amount of $CO_2$ absorbed. The reaction of such a piperazine derivative with carbon dioxide forms a carbamate bond. Therefore, a large amount of energy is required to separate carbon dioxide. From the viewpoint of the balance between the absorption and separation, such a piperazine derivative is an amine that has a problem to be solved regarding separation performance.

With respect to alkanolamines represented by formula (III), examples of compounds containing a $C_{1-2}$ alkyl group include 2-amino-2-methyl-1-propanol (AMP), 2-ethylaminoethanol (EAE), and the like. Examples of compounds containing a hydroxyl-substituted $C_{1-2}$ alkyl group include diethanolamine (DEA), N-methyldiethanolamine (MDEA), and the like.

It is said that among these alkanolamines, AMP particularly has a property of increasing the amount of $CO_2$ separated, EAE particularly enhances the $CO_2$ absorption rate, and MEDA particularly reduces the heat of carbon dioxide absorption reaction.

Preferably, the aqueous amine solution of the present invention contains 2-isopropylaminoethanol, and at least one substance selected from the group consisting of piperazine, 2-methylpiperazine, 2-amino-2-methyl-1-propanol, 2-ethylamino ethanol, and N-methyldiethanolamine.

Most preferably, the aqueous amine solution of the present invention contains 2-isopropylaminoethanol and piperazine.

In this case, the amount of 2-isopropylaminoethanol in the aqueous solution is 10 to 59 wt. %, preferably 10 to 57 wt. %, and more preferably 30 to 52 wt. %, and the amount of piperazine is 1 to 25 wt. %, preferably 2 to 20 wt. %, and more preferably 3 to 10 wt. %.

This is based on the finding that the combined use of IPAE having a high separation performance with PZ having a high absorption performance can achieve improved performance that cannot be achieved by the use of either of the amines singly. Further, optimization of the amount of PZ component added reduces the entire heat of reaction to thereby reduce the energy required for $CO_2$ recovery.

Next, the total amine content of the aqueous amine solution of the present invention is described.

Generally, the higher the concentration of amines, the greater the amount of $CO_2$ absorbed, the greater the $CO_2$ absorption rate, the greater the amount of $CO_2$ separated, and the greater the $CO_2$ separation rate. A higher amine concentration is preferable from the viewpoint of energy consumption, plant facility size, and efficiency. However, when the amine concentration is more than 70% by weight, problems such as reduction in the amount of $CO_2$ absorbed, poor mixing of amine components, and increased viscosity are said to occur, probably due to the reduction of effects of water as an activator. The total amine content of the aqueous amine solution of the present invention is preferably not more than 60 wt. % to avoid problems such as poor mixing of amine components and increased viscosity. When the amine concentration is less than 30 wt. %, the absorption performance and separation performance are deteriorated. Accordingly, the total amine content of the aqueous solution of the present invention is selected from 30 to 60 wt. %, preferably 30 to 55 wt. %, and more preferably 40 to 55 wt. %.

To investigate the $CO_2$ absorption performance and $CO_2$ separation performance of aqueous amine solutions containing 2-isopropylaminoethanol (IPAE), the following 3 cases were examined.

Case 1: Wherein Other Amine is a Main Component ("Main Component" Herein Refers to an Amine Component that is Contained in the Aqueous Amine Solution in the Highest Proportion) (wt. %), and IPAE is an Accessory Component This is a case in which aqueous other amine solution is modified by replacing part of other amine with IPAE, or adding a small amount of IPAE as an additive. In this case, the results showed that aqueous mixed amine solutions containing IPAE in an amount of 10 wt. % or more exhibit remarkably enhanced separation performance.

Case 2: Wherein IPAE is a Main Component, and Other Amine is an Accessory Component This is a case in which other amine is added as an additive or to partially replace IPAE.

In this case, the results showed that compared to aqueous solutions each containing one of the amines, an aqueous solution containing a mixture of the amines exhibits remarkably enhanced absorption performance, as well as enhanced separation performance.

Even when only 1 wt. % of other amine was added, performance was enhanced. When using other amine in a low concentration, stable absorption and separation performance was exhibited by the use of other amine in a concentration of 3 to 5 wt. %. This result indicates that even when uneven distribution of amines in the aqueous solution during the $CO_2$ absorption and separation steps causes non-uniformity of the concentration, use of other amine in a low concentration (3 to 5 wt. %) can stabilize the absorption and separation performance.

As stated above, the total amine content is preferably 60 wt. % or less. Accordingly, IPAE is preferably 59 wt. % or less. When the amount of other amine is 3 wt. % or more, the amount of IPAE is more preferably 57 wt. % or less.

Case 3: Wherein the wt. % of IPAE is Equivalent to the wt. % of Other Amine

This is a case in which either IPAE or other amine can be called a main component or an accessory component.

In this case, the results showed that compared to aqueous amine solutions each containing one of the amines, aqueous solutions containing a mixture of the amines exhibit improved absorption and separation performance.

As is clear from the above, the amount of IPAE is preferably 10 to 59 wt. %, and more preferably 10 to 57 wt. %. When the total amine content is 55 wt. % or less, the upper limit of the IPAE amount is preferably 52 wt. %.

The IPAE content, selection of a compound of formula (II) or (III) as other amine component, combination of the compounds, and mixing ratio can be suitably selected according to the absorption and separation performance of the amine compounds to be used. The compounds of formulas (II) and (III) can be used singly, or both can be used in combination.

As stated above, the method of the present invention uses an aqueous solution containing the above-mentioned amines in specific proportions, thereby increasing the amount of $CO_2$ separated and the separation rate, as well as the amount of $CO_2$ absorbed and the absorption rate. Therefore, the loading difference (the difference between the amount of $CO_2$ absorbed in the absorption tower, and the amount of $CO_2$ separated in the separation tower) required in the absorption and separation cycle is increased, allowing carbon dioxide to be recovered with high efficiency, and thus achieving the object of the present invention.

The amount of $CO_2$ absorbed to saturation is a value obtained by measuring the amount of inorganic carbon in the aqueous solution using a total organic carbon meter for gas chromatography. The carbon dioxide absorption rate is a value obtained by measurement using an infrared carbon dioxide meter when ¾ of the amount of $CO_2$ absorbed to saturation is absorbed.

The aqueous solution may contain anticorrosive agents, such as phosphoric acid-based anticorrosive agents, to prevent corrosion of the equipment; antifoaming agents such as silicone-based antifoaming agents, to prevent foaming; antioxidants to prevent deterioration of the absorbent; etc.

Examples of the gas containing carbon dioxide include exhaust gas from the following facilities: thermal power plants, boilers of factories or kilns of cement plants using heavy oil, natural gas or the like as a fuel; blast furnaces of iron mills, where iron oxide is reduced with coke; and converters of iron mills, where carbon in pig iron is combusted to manufacture steel. Although the concentration of carbon dioxide in the gas is not particularly limited, it is typically about 5 to about 30 volume %, particularly about 10 to about 20 volume %. When the concentration of carbon dioxide is in the above-mentioned range, the working effect of the present invention is advantageously provided. The gas containing carbon dioxide may contain, in addition to carbon dioxide, an impurity gas derived from the source, such as water vapor or CO.

Carbon Dioxide Absorption Step

The method of the present invention comprises the step of bringing a gas containing carbon dioxide into contact with the aqueous solution to absorb carbon dioxide into the aqueous solution. The method of bringing a gas containing carbon dioxide into contact with the aqueous solution is not particularly limited. Examples include a method comprising bubbling a gas containing carbon dioxide into the aqueous solution to absorb carbon dioxide into the solution; a method comprising mist-spraying the aqueous solution over a gas stream containing carbon dioxide (misting or spraying method); and a method comprising bringing a gas containing carbon dioxide into countercurrent contact with the aqueous solution in an absorption tower containing a porcelain or metal mesh filler.

The gas containing carbon dioxide is absorbed into the aqueous solution at a solution temperature of typically room temperature to 60° C. or less, preferably 50° C. or less, and more preferably in the range of about 20° C. to about 45° C. The lower the temperature, the larger the amount of $CO_2$ absorbed. However, how far the temperature should be reduced is determined according to the gas temperature during the process, heat recovery target, and other factors.

The absorption of carbon dioxide is typically performed at approximately atmospheric pressure. To enhance the absorption performance, the pressure may be increased to higher levels. To reduce the energy consumption required for compression, the absorption is preferably performed at atmospheric pressure.

Carbon Dioxide Separation Step

The method of the present invention comprises the step of heating the aqueous solution containing carbon dioxide absorbed therein, which is obtained in the carbon dioxide absorption step (1), to separate and recover carbon dioxide.

Examples of the method of separating carbon dioxide from the aqueous solution containing carbon dioxide to recover carbon dioxide in a high concentration include a separation method comprising heating and boiling the aqueous solution in distillation using a pot; and a method comprising heating the aqueous solution in a plate tower, a spray tower, or a regenerator containing a porcelain or metal mesh filler to increase the liquid contact interface. Carbon dioxide is thereby freed and released from carbamate anion or bicarbonate ion.

Carbon dioxide is separated at a solution temperature of typically 70° C. or more, preferably 80° C. or more, and more preferably about 90° C. to about 120° C. The higher the temperature, the larger the amount of $CO_2$ separated. However, increased temperature requires increased energy for heating the aqueous solution. Therefore, the optimal temperature is determined in view of the gas temperature during the process, heat recovery target, etc.

The separation of carbon dioxide is typically performed at approximately atmospheric pressure. To enhance the separation performance, the pressure may be reduced to low levels. To reduce the energy consumption required for pressure reduction, the separation is preferably performed at atmospheric pressure.

The amount of $CO_2$ separated is a value measured by using a total organic carbon meter. The carbon dioxide separation rate is a value measured using an infrared carbon dioxide meter. The aqueous solution after separation of carbon dioxide is recycled to the absorption step, and reused.

The purity of the carbon dioxide thus recovered is typically about 95 to about 99.9 volume %, which is an extremely high purity. Such a high concentration of carbon dioxide can be used as chemicals, starting materials for producing polymer materials, refrigerants for freezing foods, etc. It is also possible to isolate and store recovered carbon dioxide in the underground facilities, etc., for which the technology is currently under development.

EXAMPLES

The present invention is described below in detail with reference to Examples and Comparative Examples. The present invention is not limited to these Examples. In this specification, "%" indicates "weight %", unless otherwise specified. The chemicals used in the Examples are all reagents manufactured by Tokyo Chemical Industry Co., Ltd.
Case 1, in which Other Amine is a Main Component, and IPAE is an Accessory Component The following Examples show cases in which an aqueous solution of other amine is modified by replacing part of other amine with IPAE, or adding a small amount of IPAE as an additive.

Example 1

A glass gas absorption bottle was immersed into a constant temperature water bath whose liquid temperature was set to 40° C. This bottle was filled with 50 ml of an aqueous solution containing 10 wt. % of IPAE and 20 wt. % of PZ. A mixed gas containing 20 volume % of carbon dioxide and 80 volume % of $N_2$ was dispersed as bubbles into this solution at a rate of 0.7 l/min through a glass filter with a pore size of 100 μm and a diameter of 13 mm at atmospheric pressure to cause absorption.

The $CO_2$ concentration in the gas was continuously measured at the inlet and outlet of the absorbing solution using an infrared carbon dioxide meter (HORIBA GAS ANALYZER VA-3000). The amount of $CO_2$ absorbed was determined from the difference between the $CO_2$ flow rate at the inlet and the $CO_2$ flow rate at the outlet. When necessary, the amount of inorganic carbon in the aqueous solution was measured using a total organic carbon meter for gas chromatography (SHIMADZU TOC-VCSH), and compared with the value obtained using the infrared carbon dioxide meter. The amount of $CO_2$ absorbed to saturation is defined as the amount of $CO_2$ absorbed until the $CO_2$ concentration at the outlet of the absorbing solution became equal to that at the inlet. When ½ of the amount of $CO_2$ absorbed to saturation had been absorbed, the solution still absorbed most of the $CO_2$ from the gas, and the absorption rate was substantially equal to the $CO_2$ feed rate. Therefore, the absorption rate was compared when ¾ of the amount of $CO_2$ absorbed to saturation had been absorbed. The amount of $CO_2$ absorbed to saturation was 135.7 g/L, and the absorption rate determined when ¾ of the amount of $CO_2$ absorbed to saturation had been absorbed was 4.16 g/L/min.

Subsequently, the amount of $CO_2$ separated from the solution and the separation rate were measured while raising the solution temperature to 70° C. over a period of several minutes in the same gas stream. The average separation rate during a 10-minute period from the start of raising the temperature was used to compare the separation rate. The amount of $CO_2$ separated was 30.30 g/L, and the separation rate was 2.25 g/L/min.

Examples 2 and 3

Using aqueous solutions containing IPAE, piperazine (PZ), 2-amino-2-methyl-1-propanol (AMP), and N-methyldiethanolamine (MDEA) in the concentrations shown in Table 1, the amount of $CO_2$ absorbed to saturation, the absorption rate, the amount of $CO_2$ separated, and the separation rate were measured using the same equipment and conditions as in Example 1. Table 1 shows the results.

Comparative Examples 1 and 2

Using aqueous solutions containing piperazine (PZ) and N-methyldiethanolamine (MDEA) in the concentrations shown in Table 1, the amount of $CO_2$ absorbed to saturation, the absorption rate, the amount of $CO_2$ separated, and the separation rate were measured using the same equipment and conditions as in Example 1. Table 1 shows the results.

TABLE 1

|  | Composition of the aqueous solution (wt.) | | | | $CO_2$ absorption at 40° C. | | $CO_2$ separation at 70° C. | |
| --- | --- | --- | --- | --- | --- | --- | --- | --- |
|  | Total amine content | (I) (IPAE) | (II) | (III) | Amount of $CO_2$ absorbed to saturation (g/L of the solution) | $CO_2$ absorption rate (g/L/min) | Amount of $CO_2$ separated (g/L of the solution) | $CO_2$ separation rate (g/L/min) |
| Example 1 | 30.0% | 10.0% | PZ 20.0% |  | 135.7 | 4.16 | 30.30 | 2.25 |
| Comparative Example 1 | 30.0% | 0% | PZ 30.0% |  | 128.0 | 4.50 | 14.57 | 1.76 |
| Example 2 | 50.0% | 10.0% | PZ 25.0% | MDEA 15.0% | 162.4 | 4.76 | 29.64 | 2.55 |
| Comparative Example 2 | 50.0% |  | PZ 31.2% | MDEA 18.8% | 153.5 | 4.30 | 24.70 | 2.12 |
| Example 3 | 50.0% | 12.5% | PZ 25.0% | AMP 12.5% | 184.6 | 5.08 | 25.54 | 2.30 |

A comparison between Example 1 and Comparative Example 1 in Table 1 shows that the separation performance of the aqueous solution is enhanced by replacing part of piperazine (PZ) with IPAE. An increase in the amount of $CO_2$ absorbed was also observed. The total amine content was set to 30 wt. % in Example 1. This is because PZ used alone has a low solubility, and a comparison is difficult with a total amine content of more than 30 wt. %.

Further, this result indicates that when the concentration of IPAE is 10 wt. % or more, the desired effects are provided. A comparison between Example 2 and Comparative Example 2 shows that even a three-component composition prepared by partially replacing MDEA and PZ with IPAE exhibits enhanced absorption performance and separation performance. This result shows that the three-component composition also exhibits the desired effect at an IPAE concentration of 10 wt. % or more. Although the total amine content of MDEA and PZ in Example 2 is different from that in Comparative Example 2, the relative ratio of MDEA to PZ is the same.

Example 3 also shows an example of a three-component solution. Compared to the two-component solution of Comparative Example 2, the three-component composition of Example 3 exhibits superior performance.

Case 2, in which IPAE is a Main Component and Other Amine is an Accessory Component The following Examples show cases in which other amine was added as an additive or to partially replace IPAE.

Examples 4 to 11

Using aqueous solutions containing IPAE, piperazine (PZ), 2-methylpiperazine (2 MPZ), and 2-ethylaminoethanol (EAE) in the concentrations shown in Table 2, the amount of $CO_2$ absorbed to saturation, the absorption rate, the amount of $CO_2$ separated, and the separation rate were measured using the same equipment and conditions as in Example 1. Table 2 shows the results.

Comparative Examples 3 to 4

Using aqueous solutions containing IPAE in the concentrations shown in Table 2, the amount of $CO_2$ absorbed to saturation, the absorption rate, the amount of $CO_2$ separated, and the separation rate were measured using the same equipment and conditions as in Example 1. Table 2 shows the results.

Examples 5 to 8 show examples of two-component solutions containing IPAE, and PZ that corresponds to a compound of formula (II). Compared to Comparative Example 4 having the same total amine content, the results of Examples 5 to 8 show that the addition of PZ as other amine to IPAE enhances the absorption performance and the separation performance. The relationship of the amount of PZ added as other amine to the absorption performance or separation performance is as follows. As the PZ ratio is increased, the amount of $CO_2$ absorbed and the absorption rate are increased. As the PZ ratio is decreased, the IPAE ratio is relatively increased, which increases the amount of $CO_2$ separated and the separation rate. These results reflect the properties of these amines, i.e., that PZ exhibits a high absorption performance, whereas IPAE exhibits a high separation performance. From the viewpoint of separation rate performance, the amount of PZ added is preferably 10 wt. % or less. A comparison in performance between Examples 7 and 8 shows that when PZ is added in an amount of 3% to 5%, substantially stable, well-balanced absorption performance and separation performance can be exhibited.

As described above, PZ forms a carbamate bond, and the heat of reaction is high. As a result, a large amount of energy is required to separate carbon dioxide. The heat of reaction can be reduced by decreasing the added PZ ratio, which leads to reduction of energy required to separate carbon dioxide, thus providing an advantageous effect.

Example 9 shows an example of a solution containing EAE as other amine, which corresponds to a compound of formula (III), in a proportion equivalent to that in Example 7. Compared to Comparative Example 4, the solution of Example 9 exhibits remarkably enhanced absorption performance and separation performance. However, a comparison of Example

TABLE 2

| | Composition of the aqueous solution (wt.) | | | | $CO_2$ absorption at 40° C. | | $CO_2$ separation at 70° C. | |
| --- | --- | --- | --- | --- | --- | --- | --- | --- |
| | Total amine content | (I) (IPAE) | (II) | (III) | Amount of $CO_2$ absorbed to saturation (g/L of the solution) | $CO_2$ absorption rate (g/L/min) | Amount of $CO_2$ separated (g/L of the solution) | $CO_2$ separation rate (g/L/min) |
| Example 11 | 45.0% | 30.0% | | EAE 15.0% | 132.5 | 3.38 | 47.40 | 2.71 |
| Example 9 | 50.0% | 45.0% | | EAE 5.0% | 140.0 | 3.50 | 58.03 | 4.32 |
| Example 4 | 50.0% | 35.0% | | EAE 15.0% | 145.5 | 3.55 | 49.50 | 2.95 |
| Example 10 | 45.0% | 35.0% | PZ 10.0% | | 141.4 | 4.32 | 32.50 | 2.38 |
| Example 5 | 50.0% | 35.0% | PZ 15.0% | | 155.3 | 4.30 | 40.10 | 2.89 |
| Example 6 | 50.0% | 40.0% | PZ 10.0% | | 153.3 | 4.28 | 44.30 | 3.51 |
| Example 7 | 50.0% | 45.0% | PZ 5.0% | | 149.7 | 4.11 | 49.33 | 4.30 |
| Example 8 | 50.0% | 47.0% | PZ 3.0% | | 149.4 | 4.04 | 52.03 | 4.40 |
| Comparative Example 3 | 30.0% | 30.0% | | | 98.6 | 3.02 | 34.76 | 2.07 |
| Comparative Example 4 | 50.0% | 50.0% | | | 132.2 | 2.58 | 38.52 | 2.81 |

Example 4 shows an example of a two-component solution containing IPAE and EAE. Compared to Comparative Example 3 having substantially the same IPAE concentration, or to Comparative Example 4 having the same total amine content, the solution of Example 4 additionally containing other amine exhibits superior performance both in absorption and separation. The results show that such effects are exhibited at an IPAE concentration of 30 wt. % or more.

9 with Example 7 shows that the composition of Example 7 containing PZ exhibits superior performance in terms of the absorption rate.

Compared to single use of IPAE that absorbs carbon dioxide and that forms bicarbonate ion, addition of other amine that forms carbamate anion and that has poor separation performance to IPAE enhances the separation performance. This separation performance improvement is an unexpected result.

This is probably achieved because the amine that forms a carbamate ion functions as a catalyst, and enhances the performance of the entire aqueous solution.

Even when 1 wt. % of other amine is added to IPAE, the absorption performance and separation performance are enhanced. However, as the results of Examples 7 to 9 show, addition of other amine in an amount of 3 to 5 wt. % provides substantially stable absorption performance and separation performance. Such a solution can be used as an aqueous solution for $CO_2$ recovery that achieves stable performance in a method of recovering carbon dioxide.

Case 3, in which the wt. % of IPAE is Equivalent to the wt. % of Other Amine

This is a case in which either IPAE or other amine may be called a main component or an accessory component.

Examples 12 to 17

Using aqueous solutions containing IPAE, piperazine (PZ), 2-methylpiperazine (2 MPZ), 2-ethylaminoethanol (EAE), and 2-amino-2-methyl-1-propanol (AMP) in the concentrations shown in Table 3, the amount of $CO_2$ absorbed to saturation, the absorption rate, the amount of $CO_2$ separated, and the separation rate were measured using the same equipment and conditions as in Example 1. Table 3 shows the results.

Comparative Examples 5 to 9

Using aqueous solutions each containing one amine selected from IPAE, 2-methylpiperazine (2 MPZ), 2-ethylaminoethanol (EAE), monoethanolamine (MEA), 2-methylaminoethanol (MAE), and 2-amino-2-methyl-1-propanol (AMP) in the concentrations shown in Table 3, the amount of $CO_2$ absorbed to saturation, the absorption rate, the amount of $CO_2$ separated, and the separation rate were measured using the same equipment and conditions as in Example 1. Table 3 shows the results.

TABLE 3

| | Composition of the aqueous solution (wt.) | | | | $CO_2$ absorption at 40° C. | | $CO_2$ separation at 70° C. | |
| --- | --- | --- | --- | --- | --- | --- | --- | --- |
| | Total amine content | (I) (IPAE) | (II) | (III) | Amount of $CO_2$ absorbed to saturation (g/L of the solution) | $CO_2$ absorption rate (g/L/min) | Amount of $CO_2$ separated (g/L of the solution) | $CO_2$ separation rate (g/L/min) |
| Example 17 | 45.0% | 22.5% | | EAE 22.5% | 132.5 | 3.38 | 47.70 | 2.71 |
| Example 16 | 45.0% | 22.5% | | AMP 22.5% | 142.8 | 3.28 | 64.40 | 5.12 |
| Example 15 | 45.0% | 22.5% | PZ 22.5% | | 160.4 | 4.94 | 21.46 | 2.02 |
| Example 12 | 50.0% | 25.0% | | EAE 25.0% | 144.5 | 4.20 | 45.80 | 3.15 |
| Example 13 | 50.0% | 25.0% | | AMP 25.0% | 155.7 | 3.82 | 68.50 | 4.94 |
| Example 14 | 50.0% | 25.0% | 2MPZ 25.0% | | 155.3 | 4.87 | 35.10 | 2.86 |
| Comparative Example 5 | 30.0% | | | EAE 30.0% | 103.2 | 3.66 | 19.19 | 1.16 |
| Comparative Example 6 | 30.0% | | | AMP 30.0% | 102.7 | 1.45 | 26.54 | 1.37 |
| Comparative Example 7 | 30.0% | | 2MPZ 30.0% | | 112.4 | 4.23 | 15.04 | 1.71 |
| Comparative Example 8 | 30.0% | | | MEA 30.0% | 120.2 | 3.98 | 6.30 | 1.13 |
| Comparative Example 9 | 30.0% | | | MAE 30.0% | 107.3 | 3.42 | 13.60 | 1.10 |
| Comparative Example 3 | 30.0% | 30.0% | | | 98.6 | 3.02 | 34.76 | 2.07 |
| Comparative Example 4 | 50.0% | 50.0% | | | 132.2 | 2.58 | 38.52 | 2.81 |

Examples 12 to 14 describe the compositions of solutions produced by adding other amine to the solution of Comparative Example 3 in the same amount (wt. %) as IPAE. The amount of each amine component was not equally set to 30% in the Examples. This is because if so, the total amine content of the resulting solutions became 60%, which affected other properties, probably due to the viscosity effects.

The results show that the aqueous mixed amine solution exhibits better performance in both the absorption and separation, compared to aqueous solutions containing one of the amines in the same concentration.

The aqueous mixed amine solution containing IPAE and AMP exhibits particularly high separation performance. This is attributable to both IPAE and AMP having high separation performance.

The absorption and separation performances of absorbing solutions of the formulations described in Examples 1 and 2 of Patent Document 4, which is cited as prior art in this specification, were also evaluated in the same manner. Table 4 shows the evaluation results as Comparative Examples 10 and 11. The amines used in Patent Document 4 are DMAE (dimethylaminoethanol), MP (2-methylpiperazine), and MDEA.

TABLE 4

| | Composition of the aqueous solution (wt.) | | | | CO$_2$ absorption at 40° C. | | CO$_2$ separation at 70° C. | |
|---|---|---|---|---|---|---|---|---|
| | Total amine content | DMAE | MP | MDEA | Amount of CO$_2$ absorbed to saturation (g/L of the solution) | CO$_2$ absorption rate (g/L/min) | Amount of CO$_2$ separated (g/L of the solution) | CO$_2$ separation rate (g/L/min) |
| Comparative Example 10 | 45.0% | 30.0% | 15.0% | | 129.5 | 2.50 | 40.5 | 3.03 |
| Comparative Example 11 | 45.0% | | 15.0% | 30.0% | 96.1 | 1.72 | 29.8 | 2.58 |

The above evaluation results show that the solution of the present invention is superior to the solutions described in the Examples of Patent Document 4 in terms of all of the amount of CO$_2$ absorbed, the absorption rate, the amount of CO$_2$ separated, and the separation rate, and also has a better balance between CO$_2$ absorption performance and CO$_2$ separation performance.

As is clear from these results, the aqueous solution containing IPAE and at least one substance selected from piperazines of formula (II) and alkanolamines of formula (III) in the content, which is used in the method of the present invention, exhibits high CO$_2$ absorption performance (the amount of CO$_2$ absorbed to saturation and the absorption rate) and high CO$_2$ separation performance (the amount of CO$_2$ separated and the separation rate). The solution of the invention has particularly high separation performance compared to conventional aqueous solutions, and therefore advantageously has a good balance between CO$_2$ absorption performance and CO$_2$ separation performance.

The invention claimed is:

1. A method for recovering carbon dioxide from a gas containing carbon dioxide, comprising:
   the step (1) of bringing a gas containing carbon dioxide into contact with an aqueous solution consisting essentially of 2-isopropylaminoethanol represented by formula (I):

[Chem. 1]

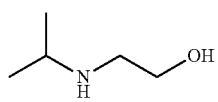

(I)

and at least one substance selected from the group consisting of piperazines represented by formula (II):

[Chem. 2]

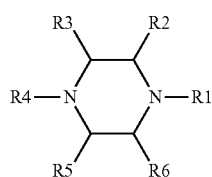

(II)

wherein R2, R3, R5, and R6 are the same or different, and represent hydrogen, a C$_{1-2}$ alkyl group, an amino-substituted C$_{1-2}$ alkyl group, or a hydroxyl-substituted C$_{1-2}$ alkyl group; R1 and R4 represent hydrogen; and
   alkanolamines represented by formula (III):

[Chem. 3]

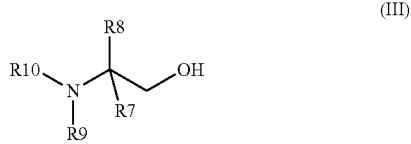

(III)

wherein R7, R8, and R9 are the same or different, and represent hydrogen, a C$_{1-2}$ alkyl group, an amino-substituted C$_{1-2}$ alkyl group, or a hydroxyl-substituted C$_{1-2}$ alkyl group, and R10 represents hydrogen to absorb carbon dioxide into the aqueous solution; and
   the step (2) of heating the aqueous solution containing carbon dioxide absorbed therein, which is obtained in step (1), to separate and recover carbon dioxide from the solution.

2. The method for recovering carbon dioxide according to claim 1, wherein in step (1), the gas containing carbon dioxide is brought into contact with the aqueous solution at a temperature of not more than 60° C., and in step (2), the aqueous solution containing carbon dioxide absorbed therein is heated to 70° C. or higher to separate carbon dioxide from the solution.

3. The method for recovering carbon dioxide according to claim 1, wherein the piperazines represented by formula (II) are at least one compound selected from the group consisting of piperazine, 2-methylpiperazine, and 2-aminomethylpiperazine.

4. The method for recovering carbon dioxide according to claim 1, wherein the alkanolamines represented by formula (III) are at least one substance selected from the group consisting of 2-amino-2-methyl-1-propanol and 2-ethylaminoethanol.

5. The method for recovering carbon dioxide according to claim 1, wherein the aqueous solution contains 2-isopropylaminoethanol and piperazine.

6. The method for recovering carbon dioxide according to claim 1, wherein the total amine content of the aqueous solution is 30 to 60 wt. %, and the 2-isopropylaminoethanol content is 10 to 59 wt. %.

* * * * *